United States Patent [19]
Brennan et al.

[11] Patent Number: 5,419,355
[45] Date of Patent: May 30, 1995

[54] METHOD AND APPARATUS FOR DISSOLVING A TREATING MATERIAL

[75] Inventors: James P. Brennan, Wallingford; Rocco Telese, Waterbury, both of Conn.

[73] Assignee: Olin Corporation, Stamford, Conn.

[21] Appl. No.: 151,328

[22] Filed: Nov. 12, 1993

[51] Int. Cl.$^6$ ............................................. B01D 11/02
[52] U.S. Cl. ........................................ 137/1; 137/268; 239/310; 422/261
[58] Field of Search ............... 137/268, 1; 422/261, 422/264, 282, 283; 239/310

[56] References Cited

U.S. PATENT DOCUMENTS

| | | | |
|---|---|---|---|
| 2,603,534 | 7/1952 | Miller | 422/264 X |
| 2,708,517 | 5/1955 | Evans | 422/261 X |
| 3,595,395 | 7/1971 | Lorenzen | 422/282 X |
| 4,210,624 | 7/1980 | Price | 422/264 |
| 4,250,911 | 2/1981 | Kratz | 137/268 |
| 4,867,196 | 9/1989 | Zetena et al. | |
| 5,076,315 | 12/1991 | King | 422/264 X |
| 5,133,381 | 7/1992 | Wood et al. | |

OTHER PUBLICATIONS

Booklet "Pulsar II Commercial Pool Feeder" by Olin Corporation, Stamford, Conn., pp. 1, 4, 5, and 6.

*Primary Examiner*—Martin P. Schwadron
*Assistant Examiner*—Kevin L. Lee
*Attorney, Agent, or Firm*—William A. Simons

[57] ABSTRACT

An apparatus and method for dissolving a chlorine containing treating material such as calcium hypochlorite in which water is fed to a container preferably in the form of a column containing the treating material. The water is caused to cyclically rise in the container to a predetermined height to dissolve a portion of the material and then discharge to a storage container to empty the material containing container. The height at which the water rises within the container, the cross-sectional area of the container and the length of time the liquid is in contact with the material during the cycle is set to produce a solution having a concentration of from between about 2 to about 18% available chlorine at a feed rate of at least about 2 lbs/hr available chlorine. The cyclical action is preferably achieved through the use of a siphon tube connected to the material holding container and through which the fluid in the container is discharged. The ratio of the internal cross-section area of the column to the internal cross-sectional area of the siphon tube is less than 700 and preferably in the range of 500 to 100.

14 Claims, 2 Drawing Sheets

METHOD AND APPARATUS FOR DISSOLVING A TREATING MATERIAL

BACKGROUND OF THE INVENTION

1. Field of the Invention

This invention relates generally to a method and apparatus for dissolving a treating material. More particularly, this invention relates to a method and apparatus for dissolving a solid soluble treating material to provide a solution of such material for feeding into a system to be treated.

2. Description of the Prior Art

Chlorine is used in many industrial applications for treating purposes. It can be used for sanitizing, bleaching, oxidizing and preventing the buildup of unwanted vegetable and animal matter such as algae and marine life. Although in some instances, the chlorine is supplied as gaseous chlorine or liquid sodium hypochlorite, a dry, solid calcium source of chlorine such as calcium hypochlorite offers many advantages over gaseous chlorine or liquid sodium hypochlorite. It is stable, concentrated and relatively easily handled. However, many industrial treating systems utilize a water based solution for treating purposes. In the presence of water, solid calcium hypochlorite tends to cake and become corrosive.

The solid chlorine-containing material may be metered directly into the system to be treated or dissolved and then metered into the system to be treated to provide the proper concentration of chlorine for the system to be treated. However, delivery systems for solids of this type tend to be expensive and, due to the caking and corrosion, tend to be unreliable.

A feeder for dissolving and feeding a solid soluble sanitizing material such as calcium hypochlorite, into a body of water such as a swimming pool is shown and described in U.S. Pat. No. 4,867,196, issued Sep. 19, 1989 to C. N. Zetena et al, and U.S. Pat. No. 5,133,381, issued Jul. 28, 1992 to Wood et al. The disclosure of both of these patents are hereby incorporated herein by reference in their entirety. As described in these patents, the feeder includes three separate chambers: a discharge chamber, a dissolving chamber and a removable solid tablet container or hopper. Water is fed into the dissolving chamber which contains tablets of calcium hypochlorite until the water rises to a point that a siphon tube, connected between the dissolving chamber and the discharge chamber, permits the solution in the dissolving chamber to flow into the discharge chamber.

While such feeders have been successful, their application has generally been limited to low volume applications such as swimming pools where the required concentration of available chlorine in the treating solution is relatively low, on the order of less than 2 percent. In many industrial applications, the required concentration of chlorine in the treating solution is at least 2 percent, and on the order of 5 percent or greater, and the required feed rate of available chlorine in a given time period is greater than that capable of being produced by such feeders.

SUMMARY OF THE INVENTION

It is an object of the present invention to provide an improved system and method for dissolving a treating material.

More specifically, it is an object of the present invention to provide an improved system and method for dissolving a solid soluble treating material to provide a solution of such material for feeding into a system to be treated.

Another object of the present invention is the provision of an improved system and method for dissolving a treating material which will provide a feed rate of the treating material.

Yet another object of the present invention is the provision of an improved method and system for dissolving a treating material which will provide the desired level of concentration of the treating agent such as chlorine in the solution.

These and other objects, features and advantages of the present invention may be achieved according to one embodiment of the present invention in which an apparatus for dissolving a chlorine containing solid soluble treating material to provide a solution for dispensing into a system to be treated is provided which comprises a column having a side portion and a base for holding a plurality of solid tablets of the water treating chemical, an inlet port in said base for attachment to a supply of fluid, an outlet port in the side portion of said column at a predetermined height above the interior of the base, and a storage container for holding a supply of solution exiting from said outlet port. The height of said outlet port and the flow rate of the fluid passing up through the column is adjusted to provide a given residence time of the fluid within the column to provide the desired concentration of treating chemical in the exiting solution.

According to another aspect of the invention, a method of dissolving a chlorine containing solid soluble treating material to provide a solution for dispensing into a system to be treated may comprise, providing a column for holding a said treating material in solid tabular form, providing a treating material in said column, providing an entrance in the base of the column for the introduction of fluid into the column, providing an exit port in the side of the column at a predetermined height above the interior of the base of the column, and causing a fluid to flow into the bottom of the column at a flow rate such that for the predetermined height of the exit port, the fluid will have a residence time within the column to provide the desired concentration of the chemical in the resulting solution exiting from the exit port.

According to a further embodiment of the present invention, an apparatus for dissolving a chlorine containing solid soluble treating material to provide a solution for dispensing into a system to be treated may comprise a container for holding said treating material, an input line for supplying a fluid to said container, and siphon means including a siphon tube connected to said container. The siphon means permits the fluid in said container to cyclically rise in said container to a predetermined height in contact with said treating material and then discharge through the siphon tube to empty the container of the solution therein. The ratio of the internal cross-section of the container to the internal cross-sectional area of the siphon tube is 700 or less.

According to another embodiment of the invention, a method for dissolving a chlorine containing solid soluble treating material to provide a solution for dispensing into a system to be treated may comprise providing a container for holding a quantity of treating material, providing a source of fluid to said container, providing a siphon means including a siphon tube and causing the fluid to cyclically rise in said container to a predetermined height in contact with the treating material contained therein and then discharge through the siphon tube into a storage container, and selecting the internal cross-sectional area of the container and the internal cross-sectional area of the siphon tube such that the ratio of these container area to the siphon tube area is 700 or less.

According to another embodiment of the present invention a method of dissolving a chlorine containing solid soluble treating material to provide a solution containing available chlorine may comprise providing a container for holding the solid material, causing a fluid cyclically to flow into said container to contact a portion of the material in the container to cause the material to dissolve and then discharge the resulting solution into a storage chamber, and controlling the height of the fluid in the container in contact with the material before the fluid is discharge and the length of time the fluid remains in contact with the material to provide a solution having a concentration of between about 2 to about 18% available chlorine at a feed rate of at least 2 lbs/hr available chlorine.

BRIEF DESCRIPTION OF THE DRAWINGS

The objects and advantages of the present invention will become more apparent by reference to the following detailed description and to the accompanying drawings in which.

DETAILED DESCRIPTION OF THE PREFERRED EMBODIMENTS

Figure 1:
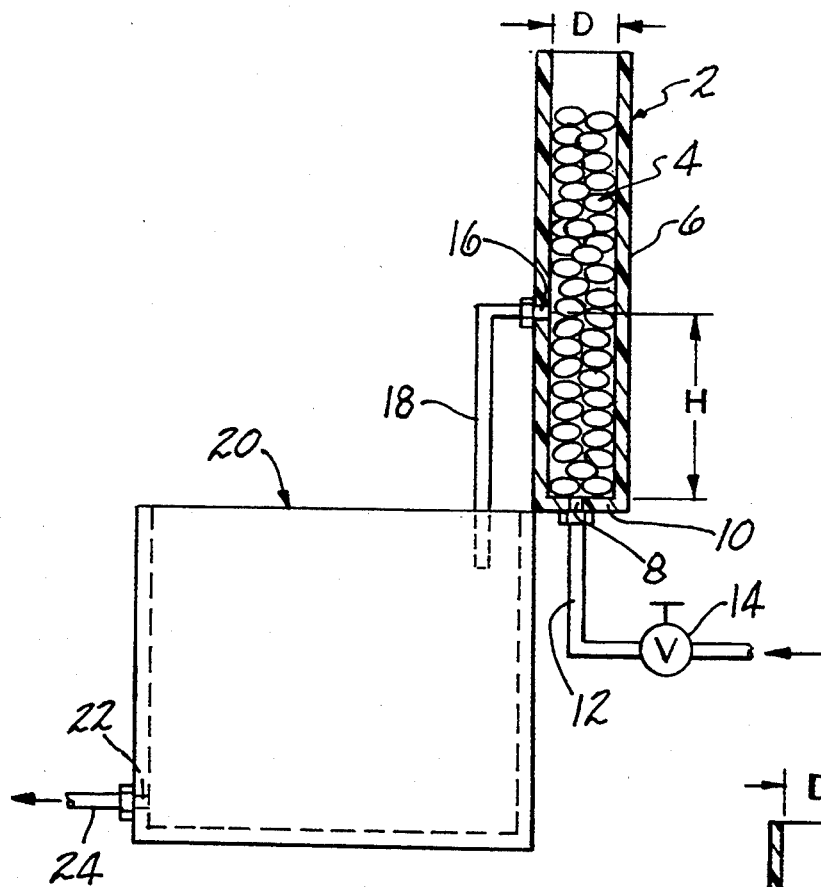
FIG. 1 is a schematic illustration of one embodiment of a dissolving system incorporating the present invention.

Referring to the drawings and particularly FIG. 1, a dispensing system in accordance with one embodiment of the present invention may comprise a container 2 in which tablets or briquettes 4 of the solid, soluble chemical treating compound may be placed. The chemical treating compound may be a hypochlorite and is preferably calcium hypochlorite which is commercially available in tablet and briquette form. According to this embodiment, the container 2 is in the form of a column 6 having a fluid inlet 8 provided in its base or bottom 10. The column 6 may have any desired cross-sectional shape although a circular cross-section is preferred.

A fluid input line 12, connected to a source of fluid such as water under pressure, is attached to the fluid inlet 8 to provide a source of fluid to the interior of the column 6. A suitable valve 14 is provided in the input line 12 to control the flow of the fluid to the column 6.

An outlet port 16 is provided in the side of the column 6 at a height "H" above the horizontal plane of the inside surface of its bottom 10. The height "H" is preferably greater than the maximum width of the column 6. The overall height of the column 6 is greater than the height "H" so that when the tablets 4 are placed in the column, a portion of the tablets will be in a dissolving section of the column, defined by the height "H" in a position to be wetted by the fluid passing therethrough and dissolve therein, and another portion of the tablets 4 will be positioned in a dry section, above the level of the height "H", in a position to replace the dissolved tablets in the dissolving section as they are consumed. A hopper (not shown) may be provided to replenish automatically the tablets in the dry section as they are used.

A solution outlet line 18 is connected to the fluid outlet port 16 in the side of the column and connects with a storage container 20. The storage container 20 has an outlet port 22 adjacent its bottom which is connected by an output line 24 to any suitable dispensing system (not shown) for feeding the treating solution into the system to be treated. A suitable dispensing system may be of the type shown and described in co-pending patent application entitled "A System and Method for Dispensing a Treating Material" by James P. Brennan filed on Oct. 27, 1993 and having Ser. No. 08/141,761. Such a system utilizes an eductor which draws the treating solution from the storage container 20 into the motive fluid passing through the eductor and into the system to be treated.

The concentration of the treating solution is controlled by the residence time of the fluid in the lower or dissolving section of the column 6. Higher concentrations of solution for a column 6 having a diameter "D", and thus a given cross-sectional area, and an outlet port 16 at a given height "H" is achieved by slowing the rate of circulation of the fluid through the dissolving section of the column by adjusting the flow control valve 14.

In the operation of the system of FIG. 1, tablets 4 are loaded into the column 6 and water or other suitable fluid is fed into the column 6 through the base 10. The water flows upwardly in the column, with the solution resulting from the dissolving of the tablets exiting from the column 6 though the outlet port 16 to the storage container 20. The solid residue which might foul the feeder may be removed by maintaining the upward linear flow of the water within the column 6 at a rate to exceed the settling rate of the residue whereby the residue will be removed from the dissolving portion of the column 6. The minimum linear flow depends upon the characteristics of the tableted material.

The diameter "D" of the column, or more specifically its cross-sectional area, and the height "H" of the output port 16 is selected to provide the proper range of concentration of the resulting solution and feed rate given the available flow rate of the incoming fluid. By feed rate it is meant the pounds per hour of available chlorine dissolved into solution and available for dispensing into the system to be treated. The resulting concentration of the solution should be from 2 to 18 percent, preferably from 3 to 10 percent, and most preferably from 5 to 7 percent available chlorine. The feed rate should be at least about 2 pounds per hour (lbs/hr) and up to about 250 lbs/hr or more of available chlorine.

Figure 2:
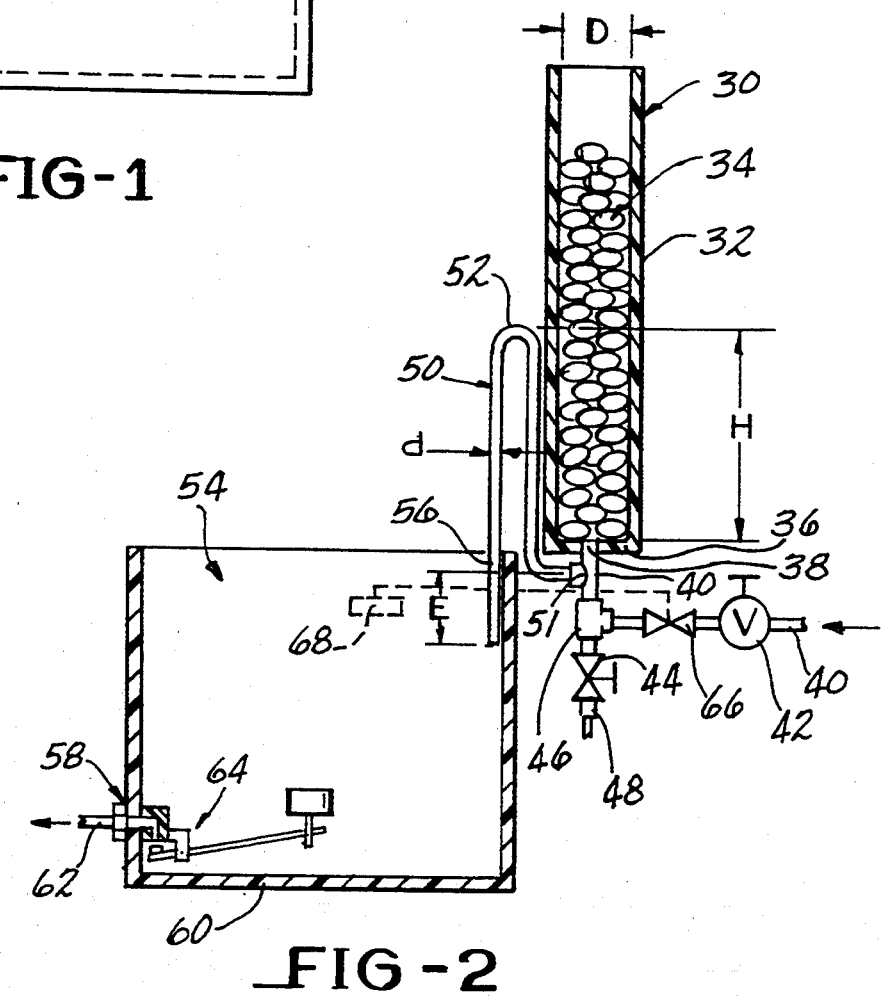
FIG. 2 is a schematic illustration of a second embodiment of a dissolving system incorporating the principals of the present invention.

Referring to FIG. 2, another embodiment of the present invention is shown which includes a chamber 30 for holding a plurality of tablets 32 or briquettes of a solid soluble treating chemical. The chamber 30 is preferably in the form of a tubular column 34. The column 34 may have any cross-sectional configuration although it is preferred that it be circular in cross-section. The column 34 has an internal diameter "D" as shown which provides a given internal cross-sectional area "A" of $\pi D^2/4$. The tablets 32 are preferably a solid hypochlorite such as calcium hypochlorite. The column 34 may be constructed of a suitable chlorine resistant material such as an appropriate plastic material. Polyacrylate is a preferred material, although polyethylene, polycarbonate and fiberglass reinforced plastics are examples of other suitable materials that may be employed. A hopper (not shown) may be provided in connection with the chamber 30 to feed automatically tablets into the chamber 30 as they are used.

The bottom or base 36 of the column 34 may be provided with an inlet port 38 to which is connected an inlet line 40. The inlet line 40 includes a flow control valve 42 positioned between the column 34 and a source of fluid such as water under pressure. The inlet line 40 also includes a drain valve 44 which may be opened to drain the fluid from the column 34. As shown in FIG. 2, the inlet line 40 includes a T-shaped connector 46 so that the drain valve 44 is provided in a vertically extending drain line 48.

A siphon tube 50 is connected to the inlet line 40 at a connection point 51 immediately below the base 36 of the column 34 and downstream of the flow control valve 42. The siphon tube 50 has a generally inverted U-shape with the curved upper portion 52 being vertically positioned at a height above the horizontal plane of the interior surface of the base 36 of the column 34 such that the fluid will rise to a height "H" in the column 34 before the siphoning of the fluid begins. The siphon tube 50 has a circular internal cross-section with a predetermined internal diameter "d" providing it with a predetermined cross-sectional area "a" equal to $\pi d^2/4$.

The column 34 is connected to or otherwise associated with a storage container 54 into which the open leg 56 of the siphon tube 50 extends. The open leg 56 of the siphon tube 50 terminates within the confines of the storage container 54 at a point which is vertically spaced downwardly a distance "E" from the connection 51 of the siphon tube 50 to the input line 40.

The storage container 54 has an outlet port 58 adjacent its bottom 60. An outlet line 62 is connected to the outlet port 58 which in turn is connected to an appropriate dispensing system for drawing the treating solution from the storage container 54 and dispensing it into a system to be treated. A dispensing system such as mentioned above for use in connection with the embodiment of FIG. 1 may also be used with the dissolving system of FIG. 2. A float actuated valve 64 is provided in connection with the outlet port 58 which will close the outlet port 58 when the solution in the storage container 54 drops below an appropriate level to prevent air from being drawn into the dispensing system.

A level control shut-off valve 66 is provided in the inlet line 40 to the column 34 downstream of the flow control valve 42 and upstream of the siphon connection 51. This valve 66 may be a float operated valve having a float 68 mounted in the storage container 54 which will rise with the solution level therein and cause the valve 66 to close when the level of the solution in the storage container 54 reaches its maximum height thereby preventing the storage container 54 from overflowing. Alternatively to a float controlled valve 66, other liquid level sensing means may be used to control the level of solution in the storage container. For example, a liquid level sensor such as a magnetic level sensor may be used to operate the shut-off valve 66.

In the operation of the apparatus shown in FIG. 2, liquid, such as water, is supplied to the inlet line 40 under pressure whereby it flows at a constant flow rate through the flow control valve 42 and through the base 36 of the column 34 and rises therein. The water will rise in the column 34 until it reaches the height "H", wetting the tablets 32 contained within that height "H" of the column 34, and causing the dissolution thereof. The tablets 32 positioned in the upper section of the column 34 above the height "H" serve to replenish the tablets 32 in the lower section of the column 34 as they dissolve. The hopper (not shown) will automatically replenish the tablets in the upper section of the column as the tablets therein are used.

Simultaneously with the rise of the water in the column 34, the water will rise in the upwardly leg of U-shaped portion 52 of the siphon tube 50 connected to the inlet line 40. When the water in the siphon tube 50 reaches the top of the interior of the U-shaped portion 52 of the tube 50 at height "H", and begins its downward travel in the outside leg 56 of the tube 50, a siphoning action is created, drawing the solution from the interior of the column 34 back down though the inlet port 38, through the siphon tube 50 and into the storage container 54. The siphoning action will continue until the liquid level in the column 34 and the inlet line 40 drops below the connection 51 to the siphon tube 50 so that an air break occurs and the siphoning action is broken. The fill cycle then begins again and water will continue to fill the column 34 until it again reaches the height "H". Thus the provision of the siphon tube serves to cause the cyclical filling of the column with water and the discharge of the solution formed by the contact of the water with the tablets in the column into the storage container 54. The cycle time of such operation as used herein is the time it takes from the start of one filling operation to the start of the next filling operation.

The flow rate of the fluid such as water entering the column 34 is controlled by the flow control valve 42. With any given system according to the present invention, the minimum flow rate is that required to start the siphon effect as the water rises in the upwardly leg of U-shaped portion 52 of the siphon tube 50 and begins to flow over the bend of the U-shaped portion 52. If the flow rate is too low, the water will merely trickle over the U-shaped bend without creating the siphon action to drain the column 34. The maximum flow rate is that at which the level of the incoming fluid, after the siphoning action has started, will not drop below the siphon connection 51 to the fluid inlet 40 and admit air to break the siphon effect.

The concentration of the solution and the feed rate of available chlorine for a given flow rate of incoming fluid is determined by the cycle or residence time of the fluid within the column 34 and the volume of material in the column height "H". The cycle time and volume are determined by the siphon height "H" and the internal cross-sectional areas of the siphon tube 50 and column 36. These internal cross-sectional areas are set so that the ratio of the internal cross-sectional area of the column 34 to the internal cross-sectional area of the siphon tube is less than about 700:1 and preferably in the range of about 500 to 100:1 to provide the capability of achieving the desired feed rate and concentration.

The siphon height "H" is set so that with the internal cross-sectional areas of the column and siphon tube within the range of the area ratios set forth above, the cycle time will be such as to produce the required concentration and feed rate of available chlorine. Preferably the height "H" is greater than the maximum internal width of the column 36. For industrial applications, the feed rate generally should at least about 2 lbs/hr and up to about 250 lbs/hr or more of available chlorine with a solution having a concentration of from about 2 to 18 percent available chlorine, preferably from about 3 to about 10, and most preferably from about 5 to about 7 percent available chlorine. The cycle time to achieve these concentrations and feed rates should be less than 1 hour, preferably less than a half-hour and more preferably in the range of from about 1 to about 15 minutes.

The siphon tube 50 should be connected to the fluid inlet 40 at a point as close to the base 36 of the column 34 as practical. While FIG. 2 shows the tube 50 connected to the input line 40, alternatively, the siphon tube 50 may be connected directly to the column 34 at a point adjacent its base. By having the connection of the siphon tube 50 as close to the base as practical, the "totally dry time" of the tablets is minimized. The "totally dry time" is the time during which no fluid is in contact with any of the tablets in the column 34. This occurs from the time the siphon action causes the fluid in the column to drop below the level of the tablets until the siphon action is broken and the fluid begins to refill the column and contacts the tablets at the bottom of the column. Preferably, the "totally dry time" should be less than about a minute. If the "totally dry time" is too long, the cycle time must be unduly extended to achieve a given concentration with the result that the required feed rate may not be achieved. A relatively long "totally dry time" also results in a relatively long period of time within the cycle period during which there is no dissolution of the material into the fluid within the container. This results in reducing the concentration of the resulting solution for an equivalent cycle time.

The solid residue which might foul the apparatus may be removed by maintaining the linear flow of the water within the column 34 at a rate to exceed the settling rate of the residue whereby the residue will be removed form the dissolving portion of the column 34. The minimum linear flow depends upon the characteristics of the tableted material. The flow rate of the fluid entering the column 34 and the internal cross-sectional area of the column 34 in combination with the cross-sectional area of the siphon 50 should be such as to provide the necessary linear flow rate to fluid in the column 34 at the concentrations and feed rates desired.

Based upon the above considerations, calcium hypochlorite tablets may be dissolved by providing an column 34 for holding a supply of the tablets and providing an inverted U-shaped siphon tube having a connection to the column adjacent its base. The size of the column and siphon tube are selected so that the ratio of the internal cross-sectional area of the column to the internal cross-sectional area of the siphon tube is less than about 700:1 to provide for the necessary production rate. The siphon height of the siphon tube, which is the height "H" which the fluid must rise in the column before the siphon action is initiated, is selected to provide the necessary residence time of the fluid in contact with the tablets before the siphon action is begun, to provide the desired concentration of the treating material in the solution, with the column cross-sectional area as selected.

If the concentration is not exactly what is desired, fine adjustments to the concentration may be made by changing the flow rate of the fluid to the column 34 by means of the valve 42. The feed rate may be adjusted by changing the distance "E" by which the end of the open leg 56 of the siphon tube extends below the connection 51 of the siphon tube 50 to the input line 40. By extending the end of the siphon tube vertically downwardly to increase the extension "E", the feed rate will increase. Decreasing the extension "E" will decrease the feed rate.

The following Examples will further illustrate the present invention:

An apparatus was constructed according to FIG. 2 utilizing a circular plastic column having a 3.75" internal diameter. A plastic siphon tube having a ¼" internal diameter was connected to the inlet. With this arrangement, the ratio of the internal cross-sectional area of the column to the internal cross-sectional area of the siphon was 225 to 1. The siphon tube provided a height "H" of 24 inches and had an extension "E" of 6 inches. The overall height of the column was greater than 24 inches so that when loaded with tablets of calcium hypochlorite, a portion of the loaded tablets were above the 24 inch height. Water was caused to flow into the column through the inlet at the base at an inflow rate of 0.6 liters per minute. This arrangement provided an approximately 5 minute cycle time (the time required for the column to fill to the height "H", drain due to the syphon action, and begin filling). The operation of the apparatus under these conditions provided a solution having a concentration of 4.88% available chlorine at a feed rate of 3.9 lbs/hr of available chlorine.

According to another example, the apparatus as shown in FIG. 2 was provided with a column having a 7.5" internal diameter. A ⅜" internal diameter plastic syphon tube was connected to the fluid inlet and arranged to provide a height "H" of 36 inches with a downward extension "E" of 6 inches. With this arrangement, the ratio of the internal cross-sectional area of the column to the internal cross-sectional area of the siphon tube was 100 to 1. The column was filled with tablets of calcium hypochlorite above the 36 inch mark. An inflow of water through the base of the column at a flow rate of 5,5 liters per minute produced a cycle time of approximately 3 minutes and resulted in a solution having a concentration of 5.0% available chlorine at a feed rate of 36.4 lbs/hr of available chlorine.

In accordance with yet another example, the apparatus as shown in FIG. 2 was provided with a 7.5" internal diameter column. A ⅜" internal diameter plastic syphon tube was connected to the inlet and constructed to have a height "H" of 24 inches and an extension "E" of 6 inches. The ratio of the internal cross-sectional area of the column to the internal cross-sectional area of the siphon tube was 400 to 1. In this case, the inflow of water to the base of the column was 20 gals/hr. This arrangement provided a cycle time of approximately 8 minutes and produced 10.5 lbs/hr of available chlorine in a solution having a concentration of 6.3% available chlorine.

In accordance with a further example, the flow rate of the water to the tablets in the previous example was changed to 30 gals/hr. With this incoming flow rate, the apparatus had a cycle time of about 7 minutes, 40 seconds and produced a solution having a concentration of 4.335 available chlorine at a feed rate of 10.9 lbs/hr available chlorine.

Figure 3:
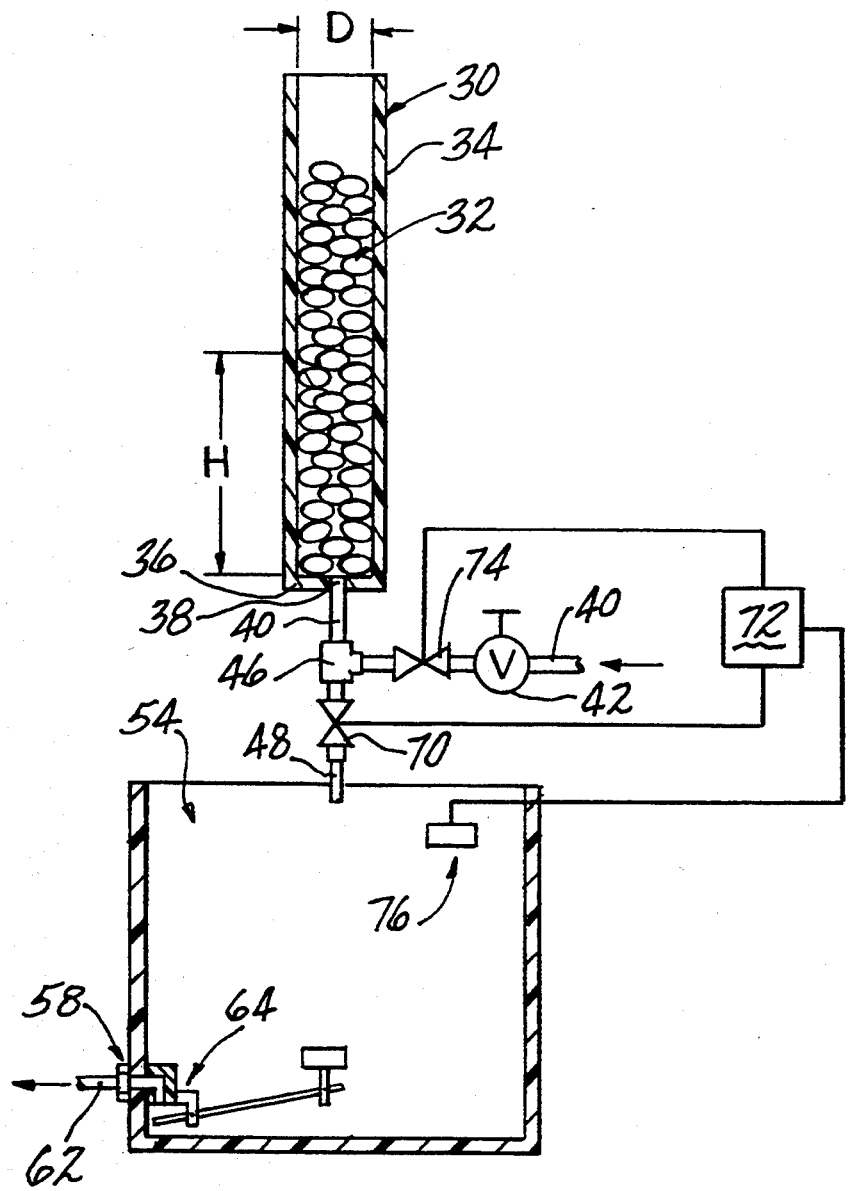
FIG. 3 is a schematic illustration of a third embodiment of a dissolving system incorporating the present invention.

FIG. 3 shows another embodiment of a dissolving apparatus in accordance with the present invention which utilizes a cyclical or pulsed feed of the liquid to the container 34 containing the material to be dissolved. The embodiment of FIG. 3 is similar to that of FIG. 2 except that the siphon tube is eliminated. Also, an electrically actuated on-off timing valve 70, connected to a controller 72, is substituted for the drain valve of the embodiment of FIG. 2. Also, an electrically actuated on-off timing valve 74, connected to the controller 72, is substituted for the level control valve in the input line 40 of the embodiment of FIG. 2. Each of the valves 70 and 74 may be any suitable type of electrically actuated valves such as a solenoid valve. A liquid level sensor 76 may be positioned to sense the level of the solution in the storage container 54 and provide a signal to the controller 72 to cause the valve 74 to close when the solution in the storage container reaches it maximum height to prevent overflow. In the embodiment of FIG. 3, the column 34 is mounted above the storage container 54 so that the fluid in the column 34 will drain through the valve 70 and outlet line 48 directly into the storage chamber 54. In the operation of the apparatus of FIG. 3, the timing of the valves 70 and 74 provide for the pulsed or cyclical filling and discharge of the column 34 with fluid such as water supplied to the column through the input line 40. With the column 34 containing the solid tablets 32 of treating material devoid of water, valve 74 is opened while valve 70 remains closed. The valve 70 remains open for the time period required to permit the water to flow into the column 34 and rise therein to the predetermined height "H". When the water reaches the height "H", the valve 74 is closed. The valve 70, after a predetermined time delay after the valve 74 is closed, is opened permitting the fluid solution in the column 34 to discharge from the column 34 through the line 48 into the storage container 54. After the time period required for the column 34 to drain, the valve 70 is closed and the valve 74 opened and the fill and drain cycle is repeated.

With the embodiment of FIG. 3, the residence time of the water in the column is controlled by the timing of the opening and closing of the valves 74 and 70 and the time delay between the closing of the valve 74 when the column has become filled with water and the opening of the valve 70 to permit the water to discharge from the column. Thus, with this arrangement, the concentration and feed rates as set forth above may be achieved by the timing of the opening and closing of the valves 70 and 74.

It may be seen from the above description and examples, that a dissolving apparatus and method, particularly suited for the dissolving of calcium hypochlorite tablets or briquettes, has been provided which can produce a treating solution which will satisfy the industrial requirements for available chlorine concentration and feed rates.

While reference has been made above to specific embodiments of the present invention, it is evident that many alternatives, modifications and variations will be apparent to those skilled in the art in light of the foregoing description. Accordingly, it is intended to embrace all such alternatives, modifications and variations as fall within the scope of the appended claims.

What is claimed is:

1. An apparatus for dissolving a chlorine-containing solid treating material to provide a solution into a system to be treated, comprising:
   (a) a container for holding said chlorine-containing solid treating material;
   (b) an inlet line for supplying a fluid to said container;
   (c) a siphon comprising a siphon tube connected to a point on said container or said inlet line and being a generally inverted U-shape of a predetermined height above the base of said container, but less than the overall height of said container; said siphon tube constructed to (1) permit said fluid in said container to cyclically rise in said container to said predetermined height while in contact with said treating material, thereby solubilizing at least a portion of said treating material and forming a solution, and (2) then cyclically discharge said solution to empty the container of the solution, wherein the ratio of internal cross-section of the container to the internal cross-sectional area of the syphon tube being 700:1 or less.

2. The apparatus of claim 1 wherein said ratio of cross-sectional areas is from about 500:1 to about 100:1.

3. The apparatus of claim 1 wherein said container is a column and said predetermined height of said siphon tube is such that the fluid can rise in said container to a height greater than the greatest internal diameter of said column.

4. The apparatus of claim 1 further including an adjustable flow control valve in said inlet line to provide a constant flow rate of fluid to said container.

5. The apparatus of claim 1 wherein said treating material is calcium hypochlorite.

6. The apparatus of claim 1 wherein said predetermined height and said internal cross-sectional area of said container and said siphon tube and said flow rate of fluid into the container are selected to produce a solution having a concentration of about 2 to about 18% available chlorine and a feed rate of at least 2 pounds per hour of available chlorine.

7. The apparatus of claim 1 wherein said input line contains a drain valve.

8. A method for dissolving a chlorine containing solid soluble treating material to provide a solution for dispensing into a system to be treated comprising:
   (a) providing a container for holding a quantity of treating material;
   (b) providing a source of fluid to said container;
   (c) providing a siphon comprising a siphon tube and causing the fluid to cyclically rise in said container to a predetermined height in contact with the treating material contained therein thereby solubilizing at least a portion of said treating material and forming a solution, and then discharging said solution through the siphon tube into a storage container; and
   (d) selecting the internal cross-sectional area of the container and the internal cross-sectional area of the siphon tube such that the ratio of these container area to the siphon tube area is 700:1 or less.

9. The method of claim 8 further including selecting the height at which the fluid-rises in the material-containing container and the internal cross-sectional areas of the column and siphon tube such that a solution is produced having a concentration of from about 2 to about 18% available chlorine and a feed rate of at least about 1 pounds per hour of available chlorine.

10. The method of claim 8 wherein said fluid reaches said predetermined height and said solution is discharged at least once an hour.

11. The method of claim 8 wherein said fluid reaches said predetermined height and said solutions discharged at least once every half hour.

12. The method of claim 8 wherein said fluid reaches said predetermined height and said solution is discharged once every 1 to 15 minutes.

13. The method of claim 8 wherein the time at which no fluid is in contact with said treating material in said container during the filling and discharge cycle is one minute or less.

14. A method of dissolving a chlorine containing solid soluble treating material to provide a solution containing available chlorine comprising:
(a) providing a container for holding said treating material;
(b) causing fluid cyclically to flow into said container to contact a portion of said treating material in the container to cause the material to dissolve and then discharge the resulting solution into a storage chamber; and
(c) controlling (i) the height of the fluid in the container while in contact with said treating material before the fluid is discharged and (ii) the length of time the fluid remains in contact with the material to thereby provide a solution having a concentration of between about 2 to about 18% available chlorine at a feed rate of at least about 2 pounds per hour available chlorine.

* * * * *